United States Patent
Moore et al.

(10) Patent No.: US 11,288,691 B2
(45) Date of Patent: Mar. 29, 2022

(54) SYSTEMS AND METHODS FOR PRICE MARKDOWN OPTIMIZATION

(71) Applicant: REVIONICS INC., Austin, TX (US)

(72) Inventors: Jeffrey Moore, Austin, TX (US); Daniel Marthaler, Austin, TX (US); Geoff Hutton, Austin, TX (US); Noberto Silva, Austin, TX (US)

(73) Assignee: REVIONICS INC.

( * ) Notice: Subject to any disclaimer, the term of this patent is extended or adjusted under 35 U.S.C. 154(b) by 0 days.

(21) Appl. No.: 16/691,119

(22) Filed: Nov. 21, 2019

(65) Prior Publication Data

US 2020/0175533 A1    Jun. 4, 2020

Related U.S. Application Data

(60) Provisional application No. 62/772,766, filed on Nov. 29, 2018.

(51) Int. Cl.
| | | |
|---|---|---|
| *G06Q 30/00* | (2012.01) | |
| *G06Q 30/02* | (2012.01) | |
| *G06F 17/18* | (2006.01) | |

(52) U.S. Cl.
CPC ......... *G06Q 30/0206* (2013.01); *G06F 17/18* (2013.01); *G06Q 30/0201* (2013.01)

(58) Field of Classification Search
CPC . G06Q 30/0206; G06Q 30/0201; G06F 17/18
See application file for complete search history.

(56) References Cited

U.S. PATENT DOCUMENTS

| | | | | |
|---|---|---|---|---|
| 7,912,748 | B1 * | 3/2011 | Rosenberg ........... | G06Q 10/087 705/7.35 |
| 2015/0081392 | A1 * | 3/2015 | Fox .................... | G06Q 30/0206 705/7.35 |
| 2018/0349158 | A1 * | 12/2018 | Swersky ............. | G06F 9/45516 |
| 2020/0143252 | A1 * | 5/2020 | Dasgupta ............. | G06K 9/6278 |

OTHER PUBLICATIONS

Thompson Sampling for Dynamic Pricing, Walmart Labs, Feb. 2018.*
Kernel Methods and Support Vector Machines, Elsevier, 2014.*
Suhasini, Elsevier, 2011, pp. 4993-4996.*

* cited by examiner

*Primary Examiner* — David J Stoltenberg
*Assistant Examiner* — Michael I Ezewoko
(74) *Attorney, Agent, or Firm* — LKGlobal | Lorenz & Kopf, LLP (57) ABSTRACT

In general, the embodiments described herein provide systems and methods for evaluating and selecting a pricing markdown solution. Specifically, these systems and methods evaluate a relatively small subset of potential markdown solutions using an objective function to determine a financial impact metric for those markdown solutions. From that relatively small subset, the systems and methods then utilize Gaussian Process Modeling to generate an estimation function of the financial impact metrics. This estimation function can then be used with a directed search to select new potential markdown solutions for evaluation, and results of those evaluations used to update the estimation function. This process is continued iteratively until an optimized markdown solution for the financial impact metric is identified.

19 Claims, 4 Drawing Sheets

SYSTEMS AND METHODS FOR PRICE MARKDOWN OPTIMIZATION

CROSS-REFERENCE TO RELATED APPLICATION

This application claims the benefit of U.S. Provisional Application No. 62/772,766, filed Nov. 29, 2018, which is incorporated herein by reference in its entirety.

TECHNICAL FIELD

Embodiments disclosed herein relate generally to inventory systems, and more particularly, to product pricing in inventory systems.

BACKGROUND

In modern retailing the pricing of products is often controlled by retailer pricing systems. These retailer pricing systems allow the seller to set the prices of products in a store and/or online, and are configured to ensure that customer is charged the appropriate price when checking out. One issue with such retailer pricing systems is the inability to set prices for products at appropriate levels to meet objectives. For example, in typical retailing systems there is no ability to respond to price elasticity and other factors to determine optimal prices and meet various objectives.

As one specific example, in current retailer pricing systems there is limited ability to efficiently optimize markdown pricing. Specifically, there has been no ability to evaluate possible schedules of markdown prices to select one that optimizes for revenue or other metrics. For example, because of computational requirements there has been no ability to efficiently evaluate and select pricing markdown schedules while accounting for the effects of product demand and other factors. This is particularly problematic for large retailers that may have millions of product-store combinations. For such large retailers, evaluating and selecting a markdown schedule while accounting for product demand for one product in one store can involve billions of calculations, and thus performing such an analysis for thousands of product-store combinations is not reasonably feasible with previous techniques. Thus, there thus remains a continuing need for improvements in retailing pricing systems, specifically, a need to provide the ability efficiently optimize markdown pricing.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In general, the embodiments described herein provide systems and methods for evaluating and selecting a pricing markdown solution. Specifically, these systems and methods evaluate a relatively small subset of potential markdown solutions using an objective function to determine a financial impact metric for those markdown solutions. From that relatively small subset, the systems and methods then utilize Gaussian Process Modeling to generate an estimation function of the financial impact metrics. This estimation function can then be used with a directed search to select new potential markdown solutions for evaluation, and results of those evaluations used to update the estimation function. This process is continued iteratively until an optimized markdown solution for the financial impact metric is identified.

The use of Gaussian Process Modeling to iteratively evaluate selected markdown solutions and generate updated estimation functions until an optimized markdown solution is identified facilitates the selection of such an optimized markdown solution with relatively low processing resources. As such, this system and method can be effectively applied to the inventories of large retailer that can have thousand s of products and thousands of stores. As will be described in detail below, in some embodiments such a system and method can provide a 50× reduction in the processing resources required to identify an optimized markdown solution.

In a first embodiment, a method of markdown optimization is provided. This method comprises: A) selecting a next markdown solution in a set of markdown solutions for evaluation, where each markdown solution in the set of markdown solutions defines a series of price reductions for a selected product to be implemented over a future defined time period; B) generating an updated estimation function of the set of markdown solutions using the selected next markdown solution and Gaussian Process Modeling; C) determining if a termination condition is met using the updated estimation function; and D) responsive to the termination condition not being met, returning to step A); and responsive to the termination condition being met, selecting a markdown solution using the updated estimation function.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In general, the embodiments described herein provide systems and methods for evaluating pricing markdown solutions and selecting an optimized markdown solution. Specifically, these systems and methods are implemented to evaluate and determine financial impact metrics for a small subset of potential markdown solutions. From those financial impact metrics, the systems and methods then utilize Gaussian Process Modeling to generate an estimation function of the financial impact metrics. This estimation function can then be used with a directed search to select new markdown solutions for evaluation, and results of those additional evaluations used to update the estimation function. This process can be continued iteratively until an optimized markdown solution for the financial impact metric is identified.

The use of Gaussian Process Modeling to iteratively evaluate selected markdown solutions and generate updated estimation functions until an optimized markdown solution is identified facilitates the selection of such an optimized markdown solution using relatively low processing resources. Specifically, these systems and methods can facilitate the selection of an optimized markdown solution while only performing an evaluation of a relatively small portion of possible markdown solutions. In some typical embodiments this can provide a 50× or greater reduction in the processing resources required to identify an optimized markdown solution. This significant improvement in processing requirements facilitates the application of markdown optimization to the inventories of large retailers that can have thousands of products and thousands of stores (where each store can be a traditional retail location, other sales location, or an internet storefront, etc.)

Figure 1:
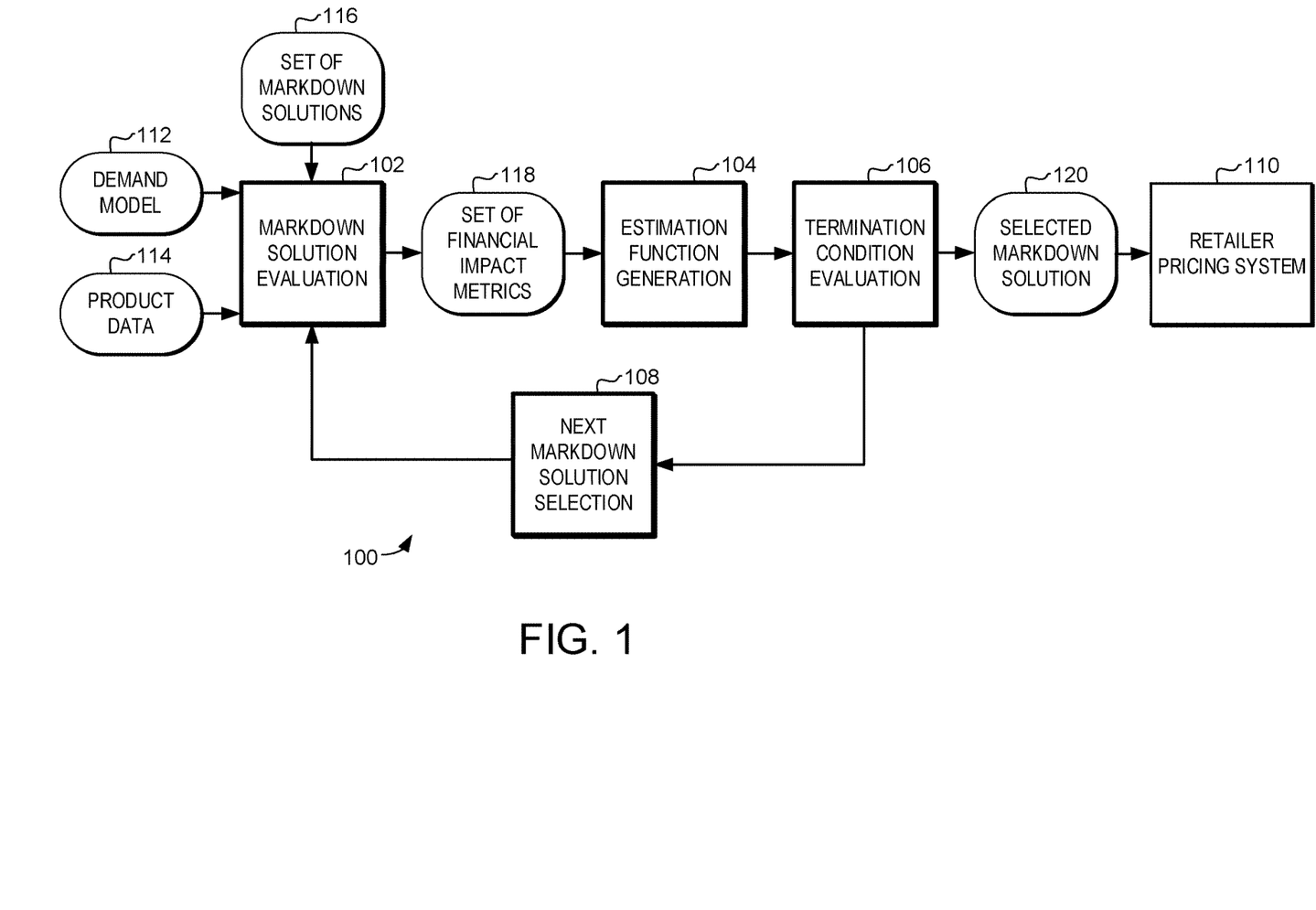
FIG. 1 is a schematic diagram of a markdown optimization system in accordance with an exemplary embodiment.

Turning now to FIG. 1, an exemplary markdown optimization system 100 is illustrated schematically. The markdown optimization system 100 includes a markdown solution evaluation module 102, an estimation function generation module 104, a termination condition evaluation module 106, and a next markdown solution selection module 108. The markdown optimization system 100 facilitates the evaluating of possible pricing markdown solutions and the selection of an optimized markdown solution with significantly reduced the processing resources.

In general, the markdown solution evaluation module 102 uses a demand model 112 and product data 114 to evaluate selected markdown solutions from a set of markdown solutions 116. From this evaluation, the markdown solution evaluation module 102 generates a set of financial impact metrics 118. The estimation function generation module 104 takes the set of financial impact metrics 118 and uses Gaussian Process Modeling to generate an estimation function of the financial impact metrics. The termination condition evaluation module 106 takes the estimation function of the financial impact metrics and uses the estimation function to determine if a termination condition is met by one of the evaluated markdown solutions, where the termination condition is implemented to identify an optimized markdown solution.

If the termination condition is not met, the next markdown solution selection module 108 selects a next markdown solution from the set of markdown solutions 116 for evaluation. The markdown solution evaluation model 102 uses the demand model 112 and the product data 114 to evaluate this selected next markdown solution. From this evaluation, the markdown solution evaluation module 102 generates a next financial impact metric which is added to update the set of financial impact metrics 118.

With this updated set of financial impact metrics 118 the estimation function generation module 104 uses Gaussian Process Modeling to generate an updated estimation function of the financial impact metrics. The termination condition evaluation module 106 takes the updated estimation function and again determines if a termination condition is met by one of the evaluated markdown solutions.

If the termination condition is again not met, the process repeatedly continues with the next markdown solution selection module 108 again selecting a next markdown solution, the markdown solution evaluation model 102 again evaluating the selected next markdown solution and generating a next financial impact metric, and the estimation function generation module 104 again generating an updated estimation function. Specifically, this process repeatedly continues until termination condition is met by a selected markdown solution 120, and the selected markdown solution 120 is then provided to the retailer pricing system 110.

In these embodiments, the use of Gaussian Processes Modeling in the estimation function generation module 104 and the use of directed search in the next markdown solution selection module 108 together implements a system of Bayesian optimization. Furthermore, using these Bayesian optimization techniques the markdown optimization system 100 is able select an optimized markdown solution that provides an improved financial impact to the retailer while only evaluating a relatively small portion of the possible markdown solutions in the set of markdown solutions 116. For example, in one typical implementation the set of markdown solutions 116 can include between 500-25000 potential markdown solutions for one product in one store. Individually evaluating each of these 500-25000 potential markdown solutions would take significant processing resources, and thus it could be impractical for a typical large retailer to perform such an evaluation for each of the possible markdown solutions for each of the products needing markdown in each of the stores.

Instead, the markdown optimization system 100 generates an estimation function using Gaussian Process Modeling and uses a directed search to relatively quickly identify an optimized markdown solution. Again, as an example in one implementation with 500-2500 potential markdown solutions for one product in one store, the markdown optimization system 100 may typically need to evaluate only 5-50 potential markdown solutions to identify an optimized markdown solution. In some embodiments this can provide a 50× reduction in the processing resources needed to identify the optimized markdown solution, and thus can provide a large retailer with the ability to perform such an optimization individually for all products needing markdown in each of the stores.

As stated above, the markdown solution evaluation module 102 uses a demand model 112 and product data 114 to evaluate selected markdown solutions from a set of markdown solutions 116. From this evaluation, the markdown solution evaluation module 102 generates a set of financial impact metrics 118.

In general, the markdown solution evaluation module 102 performs this evaluation by using the demand model 112 to forecast the resulting sales of each selected markdown solution. These forecast sales can then be applied to an objective function to generate a financial impact metric for the each evaluated markdown solution. Each financial impact metric thus expresses the predicted financial impact that is expected to result from one of the evaluated markdown solutions.

In general, each markdown solution in the set of markdown solutions 116 defines a series of price reductions for a selected product to be implemented over a future defined time period. For example, one markdown solution may include a discount of 20 percent starting in 10 days, a discount of 30 percent starting in 30 days, and a discount of 60 percent starting in 50 days and continuing to the end of the future time period.

In a typical implementation each of the markdown solutions conforms to a set of markdown constraints set by the retailer or other entity. For example, the markdown constraints can include the length of the defined time period, the maximum depth of discount percent allowed, the maximum number of separate markdowns allowed during the time period, etc.

Figure 2:
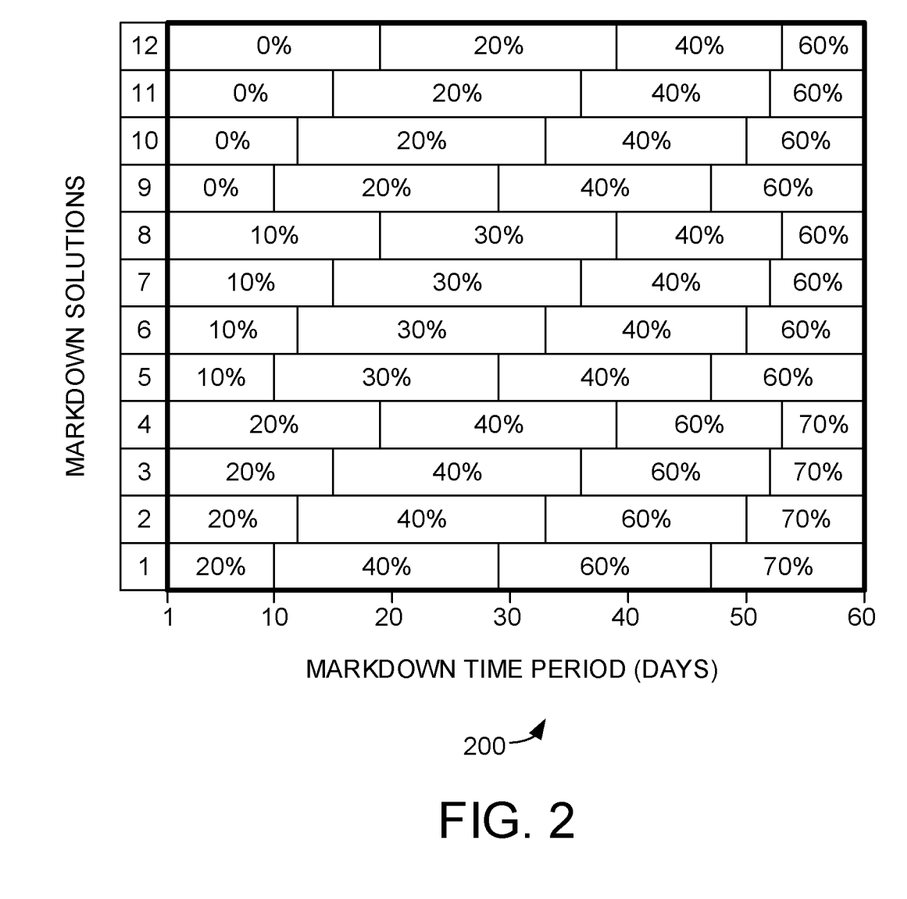
FIG. 2 is a table representation of a set of markdown solutions in accordance with an exemplary embodiment.

Turning briefly to FIG. 2, an exemplary set of markdown solutions 200 is illustrated. In this example, the set of markdown solutions 200 includes twelve different markdown solutions. Each of these twelve markdown solutions defines a different series of price reductions for a selected product to be implemented over a future defined time period of 60 days. In this case, each markdown solution includes a maximum of four markdowns and a maximum depth of discount of 70%. For example, the markdown solution #3 starts with a 20% markdown beginning at day 1, increases to a 40% markdown at day 15, increases to a 60% markdown and day 36, and finally increases to 70% markdown at day 52. Likewise, the markdown solution #12 starts with no markdown at day 1, increases to a 20% markdown at day 19, increases to a 40% markdown and day 39, and finally increases to 60% markdown at day 53. The other markdown solutions in the set of markdown solutions 200 include different discounts taken at different days.

It should be noted that the exemplary set of markdown solutions 200 illustrated in FIG. 2 is a very simplified example, and a typical real world implementation would be significantly more complex. For example, a set of potential markdown solutions for a typical product would include many more possible solutions (e.g., between 500-2500 different markdown solutions for one product). Furthermore, the various markdown solutions could include greater range and finer variation in the markdowns provided. Finally, it should be noted that while the set of markdown solutions 200 illustrate an example where the markdown time period is denoted in days and the depth of discount provided by the markdown is given as percentage, that these are just some examples. As other examples the markdown time period could be instead denoted in weeks or hours, and the depth of discount could be instead defined as specific currency amounts or other price reductions.

Returning to FIG. 1, as stated above, the markdown solution evaluation module 102 uses a demand model 112 and product data 114 to evaluate selected markdown solutions from a set of markdown solutions 116. The product data 114 can include a variety of different types of data related to the product for which markdown is to be optimized. For example, the product data can include product cost data, product categories and hierarchies. Additionally, this product data can typically include information on the seller's demand history of the product, including the quantity sold versus price for the set of products for the seller.

The demand model 112 is used by the markdown solution evaluation module 102 to evaluate selected markdown solutions from a set of markdown solutions 116. In general, demand models are used to forecast how much demand will exist over time for a product under the set of conditions defined by the markdown solution. To provide this predictive ability, the demand model 112 will typically include an expression of quantity sold as a function of price and other variables. A typical demand model 112 may also include various other terms representing other factors that also influence demand. For example, in addition to seller's price, such a demand model can include terms relating to the product itself, time varying factors, and the possibilities of product substation. Furthermore, in some embodiments, demand models can use competitive history data combined with other product data to more accurately predict demand. Examples of demand models that include competitive history components are described in pending U.S. Patent Application Publication US2017/0116624 entitled "SYSTEMS AND METHODS FOR PRICING OPTIMIZATION WITH COMPETITIVE INFLUENCE EFFECTS", published Apr. 27, 2017 and US2017/0116653 entitled "SYSTEMS AND METHODS FOR ANALYTICS BASED PRICING OPTIMIZATION WITH COMPETITIVE INFLUENCE EFFECTS", published Apr. 27, 2017.

A typical demand model will include variables (referred to herein as demand model coefficients) that can be used to tailor a demand model to a particular product. Effectively, when properly set, these demand model coefficients provide a specific instantiation of the demand model for a particular corresponding product. Typically these demand model coefficients would be determined from past product data.

Various techniques can be used for determining the demand model coefficients. As one example, demand model coefficients can be estimated through the use of empirical Bayesian estimation and past product data. In general, empirical Bayesian estimation is a technique for statistical inference in which previous data is used to estimate a prior distribution. Then, from this estimate of the prior distribution, the coefficients of the demand model can themselves be estimated from a posterior probability distribution. Other examples of techniques that could be used be for determining demand model coefficients from past product data include Maximum Likelihood, Least Squares estimation, regularized regression (Ridge or Lasso regression), or other estimation techniques.

As one specific example, a demand model, where $Q_i$ is the predicted number of items i that will be sold under the conditions described by the demand model, can be implemented as:

$$Q_i = D(t) \cdot X(t) \cdot u_i \qquad \text{Equation 1}$$

where D(t) represents the time varying demand signature, X(t) represents the time varying substitution pressure for competing products and is a function of computing utility of substitutable product options, and $u_i$ represents the utility of the item. The utility of an item $u_i$ includes intrinsic demand characteristics of the item as a function of price, promotion, availability and popularity relative to other substitutable items.

As stated above, in one embodiment the markdown solution evaluation module 102 uses an objective function in evaluating selected markdown solutions from a set of markdown solutions 116. Specifically, the markdown solution evaluation module 102 uses the demand model 112 and the product data 114 to forecast the resulting sales of each selected markdown solution. These resulting sales can then be applied to an objective function to define a financial impact metric for each selected markdown solution.

In such embodiments the objective function can be used to include a variety of business objectives set by retailer. As examples, the business objectives incorporated into objective function can include units sold, revenue, profit, price point margins, inventory position, etc. The objective function can thus be implemented to individually weigh these and other business objectives. In some cases, a retailer may simply wish to maximize revenue while minimizing left of product at the end of the markdown time period. In other cases the retailers may wish to balance revenue with the time needed to sell out the markdown product. In other cases the retailer may wish to account for other costs, such as the costs of changing prices and the costs of returning left over product to a supplier.

The objective function thus takes the desired business objectives and expresses those business objectives as one overall financial impact metric. The markdown solution evaluation module 102 can thus use objective functions in evaluating selected markdown solutions from a set of markdown solutions 116 to generate a financial impact metric for each selected markdown solution. Stated another way, each financial impact metric generated by the markdown solution evaluation model 102 thus expresses the predicted business objective impact from a corresponding markdown solutions as defined by the objective function.

For example, in one embodiment the objective function is a combination of profit and revenue metrics. As one specific example, the objective function can be defined as:

$$Obj = R - \lambda C_{remaining} \qquad \text{Equation 2.}$$

where R is revenue, C is the cost of remaining inventory following the markdown period, and $\lambda$ is a Lagrange Multiplier that expresses a tradeoff between the competing goals of maximizing revenue yield and clearing all available inventory. It should be noted that with this objective function the choice of $\lambda$ determines a choice of business strategy. In particular, lower values of $\lambda$ cause a relatively high emphasis on profit, while higher values of $\lambda$ impose an increasing penalty on remaining inventory. Another representation of such an objective function can be expressed as:

$$Obj = \Sigma_{\forall i} R_i + \lambda [(\Sigma_{\forall i} Cost_i I_i(t_{final}))] \qquad \text{Equation 3.}$$

where:

$$R_i = \Sigma_t Q_i(t)(Price_i) \qquad \text{Equation 4.}$$

and where $Q_i(t)$ is the quantity of i items sold over time t, $Price_i$ is the price of item i, and $Cost_i$ is the cost of item i. $I_i(t_{final})$ is the remaining inventory after the completion of the markdown event. Because the markdown optimization is only concerned with clearing existing inventory, maximization of revenue also achieves the goal of profit maximization because of the "sunk cost" investment that has already been made in the existing inventory.

Again, it should be noted that these are just examples of how an objective function can be implemented. Other financial objectives such as "salvage value" (moneys that may be recouped on remaining inventory e.g. by returning to a vendor), labor costs associated with in-store signage, and impact due to demand substitution with other items are examples of additional financial impact metrics that can be included in the objective function to fully express business impact from the markdown solution.

As stated above, the estimation function generation module 104 takes the set of financial impact metrics 118 and uses Gaussian Process Modeling to generate an estimation function of the financial impact metrics. In this application the "estimation function" is a function that represents the predicted distribution of the total set of financial impact metrics over all considered markdown alternatives. It should be noted that this estimation function represents the predicted distribution of high-dimensional input space. For example, in a case where each markdown solution includes a potential markdown in any of 90 different days, the estimation function would be providing a distribution that represents at least 90-dimensional input variables.

In the embodiments described herein the estimation function generation module 104 can be used to generate both an initial estimation function from an original set of financial impact metrics, and to generate updated estimation functions from updated sets of financial impact metrics as new markdown solutions are selected and evaluated.

In general, the estimation function generation module 104 uses Gaussian Process Modeling to estimate a function describing the financial impact metrics based on a relatively small sample size of determined financial impact metrics. This use of Gaussian Process Modeling is sometimes referred to as Gaussian Process Learning. Gaussian Process Modeling is in general a nonparametric learning technique that uses functions to estimate the relationship between data points. Gaussian Process Modeling thus facilitates the extraction of information about the distribution of an estimation function from a relatively small set of determined financial impact metrics.

In one specific implementation, the estimation function generation module 104 uses Gaussian Process Modeling by using known data points (i.e., the determined financial impact metrics from a relatively small subset of evaluated markdown solutions) to determine the parameters of a selected kernel covariance function. When so determined these parameters of the kernel covariance function provide an estimation function representing the distribution of financial impact metrics.

As more markdown solutions are evaluated and more financial impact metrics are determined, the parameters of the kernel covariance function generated by the Gaussian Process Modeling are updated with the new data. These parameters thus become more accurate and provide a more accurate estimation function of the financial impact metrics. As will be described in greater detail below, this process is continued until a markdown solution is identified that meets a specified terminal condition.

It should be noted these parameters of the kernel covariance function are considered "hyper-parameters" in that they influence the behavior of the modeling without mapping input to output according to any explicit functional form. Thus, kernel covariance function parameters are not generally considered to be model parameters as there is no parametric function form. Instead, the parameterized kernel covariance function provides a statistical distribution over a function space, such that any function could be evaluated to determine the likelihood that that the function was the one that generated these points.

A variety of kernel covariance functions can be used in implementing Gaussian Process Modeling in the estimation function generation module 104. As one example, a radial basis function can be implemented as the kernel covariance function. The radial basis function is a type of squared exponential function where items that are close together are similar, and items that are far away are less similar. As one example of a radial basis function each financial impact metric $\Sigma_{ij}$ can be described as:

$$\sum_{ij} = \alpha \exp\left(\frac{-|x_i - x_j|^2}{2l^2}\right). \qquad \text{Equation 5}$$

where $\alpha$ is a magnitude scalar and l is a scalar value which can be described as a "length scale". Again, the radial basis function is just one example of a kernel covariance function that can be used in Gaussian Process Modeling. Another example of a suitable kernel covariance function for some embodiments is a linear kernel function.

As will be described in greater detail below, this use of Gaussian Process Modeling thus facilitates an efficient directed search over an unknown space to identify a true optimum markdown solution with a high degree of precision.

The estimation function generation module 104 thus takes the set of financial impact metrics 118 and uses a Gaussian Process Model and Gaussian Process Learning to generate initial and updated estimation functions from the determined financial impact metrics. The termination condition evaluation module 106 takes an estimation function of the financial impact metrics and uses the estimation function to determine if a termination condition is met by one of the evaluated markdown solutions, where the termination condition is implemented to be met by an optimized markdown solution.

The termination condition evaluation module 106 can be implemented to perform a variety of tests to determine when a termination condition has been met by a markdown solution. As one example, the termination condition evaluation module 106 can be implemented to use a "probability of improvement" test as the termination condition. In this embodiment, the termination condition evaluation module 106 is implemented to determine if the probability of additional improvement for any as-yet unevaluated solution alternatives is below a threshold amount. If the probability of additional improvement is below the threshold amount, the termination condition is considered to be met and the evaluated markdown solution meeting that termination condition is selected. As one example implementation, if the probability of additional improvement is less than $1\times10^{-5}$ then the termination condition is met and the corresponding markdown solution is selected. This would correspond to a probability of 99.99% that the selected markdown solution is a true optimum solution meeting the objective function.

Such a probability of improvement test can be implemented by evaluation of the Gaussian process model for all as-yet unevaluated solutions. The Gaussian Process model provides both a "mean function" for the expected value of the objective function for as-yet unevaluated points along with a variance metric which allows us to estimate the probability of any unobserved solution resulting in an objective function value in excess of the present best-known solution. If there is still some probability that one or more unknown solutions may result in a better outcome, then we continue the search, as determined by the termination condition threshold.

Of course, the probability of improvement test is just one example of a termination condition that can be implemented by the termination condition evaluation module. Other termination conditions could include other heuristics or probabilistic tests that provide reasonable certainty that our selected best-known solution is at or near to the true optimum of the set. As an example, the mean function and variance provided by the Gaussian Process may allow us to put probabilistic bounds on the loss relative to any unobserved points, so we may choose to terminate when we have attained (as an example) at least 99.5% of the expected maximum objective function value over all solutions in the set.

As stated above, if the termination condition is not met, the next markdown solution selection module 108 selects a next markdown solution from the set of markdown solutions 116 for evaluation. That selected next markdown solution is the next markdown solution that will be evaluated by the markdown solution evaluation module 102 and used to update the estimation function. Preferably, the next markdown solution selection module 108 will select a markdown solution that quickly leads to the identification of an optimized solution. Thus, the next markdown solution selection module 108 provides a directed search for the optimal markdown solution. This directed search provides for the efficient selection of an optimized markdown solution.

A variety of techniques can be used to select the next markdown solution for evaluation. In one embodiment, the next markdown solution selection module 108 uses an acquisition function to select the next markdown solution. As one specific example of an acquisition function, the next markdown solution selection module 108 can use a maximum expected improvement function. A maximum expected improvement function determines which of the remaining unevaluated markdown solutions is likely to have the greatest expected improvement compared to the previously evaluated markdown solution and selects that markdown solution for evaluation. In general, such an acquisition function looks for areas of high uncertainty and favors more exploration early in the directed search process.

As one specific example, a maximum expected improvement acquisition function can be implemented as a statistical heuristic by evaluating the Gaussian Process Model at all unobserved points and using the mean function and variance at each point. The maximum expected improvement heuristic states that we will select the point with the highest expectation of improvement in the target objective function conditioned on that point being better than our current best-known point. This differs slightly from a probability of improvement heuristic and favors exploration into regions of higher variability (which can be more efficacious in some cases at bounding uncertainty in a smaller number of iterations than, for instance, a probability of improvement heuristic). Because such search techniques balance "exploration vs. exploitation" over an unknown target function, we cannot say a priori which heuristic will work the best for any given case, but we can select the heuristic that tends to perform best over a typical problem set. Other exemplary acquisition functions include probability of improvement maximization, maximum probability of improvement, entropy search, and upper confidence bound heuristics.

Again, it should be noted that the maximum expected improvement and maximum probability of improvement functions are just two examples of the type of acquisition function that can be used to provide for a directed search of the next markdown solution for evaluation by the next markdown solution selection module 108. This directed search, when combined with the use Gaussian Process Modeling in the estimation function generation module 104 implements a system of Bayesian optimization for the selection of a markdown solution.

With the next markdown solution selected, the markdown solution evaluation module 102 uses the demand model 112 and the product data 114 to evaluate this selected next markdown solution. As described above, the markdown solution evaluation module 102 can use the demand model 112 and the product data 114 to forecast the resulting sales of the selected next selected markdown solution, and these forecast sales can then be applied to an objective function to define a corresponding next financial impact metric. This next financial impact metric can then be added to the set of financial impact metrics 118. With this updated set of financial impact metrics 118, the estimation function generation module 104 again uses Gaussian Process Modeling to generate an updated estimation function of the financial impact metrics. The termination condition evaluation module 106 takes the updated estimation function and again determines if a termination condition is met by one of the evaluated markdown solutions.

If the termination condition is again not met, the process repeatedly continues with the markdown solution selection module 108 again selecting a next markdown solution, the markdown solution evaluation model 102 again evaluating the selected next markdown solution and generating a next financial impact metric, and the estimation function generation module 104 again generating an updated estimation function. Specifically, this process iteratively continues until termination condition is met by a selected markdown solution 120, and the selected markdown solution 120 is then provided to the retailer pricing system 110.

The retailer pricing system 110 can use the optimized markdown solution to implement the specified pricing markdowns. Typically, the implementation of how the optimized markdown solution will be used by the retailer pricing system 110 will vary based on the type of retailer and their pricing systems. For example, online and brick-and-mortar retailers typically have different pricing systems given the relative complexity to change retail prices in a store compared to an online retailer. As specific examples, in some cases a retailer will review proposed markdown solution alternatives and associated financial outcome predictions, approve and/or override recommendations, and export approved markdown recommendations to their back-office systems for subsequent pricing execution (which can involve downstream activities including updating prices or applying discounts in point of sale systems to be reflected at the time of customer purchase, scheduling labor to apply tags or on-shelf signage to reflect discounts, and updating websites to reflect new prices or discounts on impacted merchandise).

Figure 3:
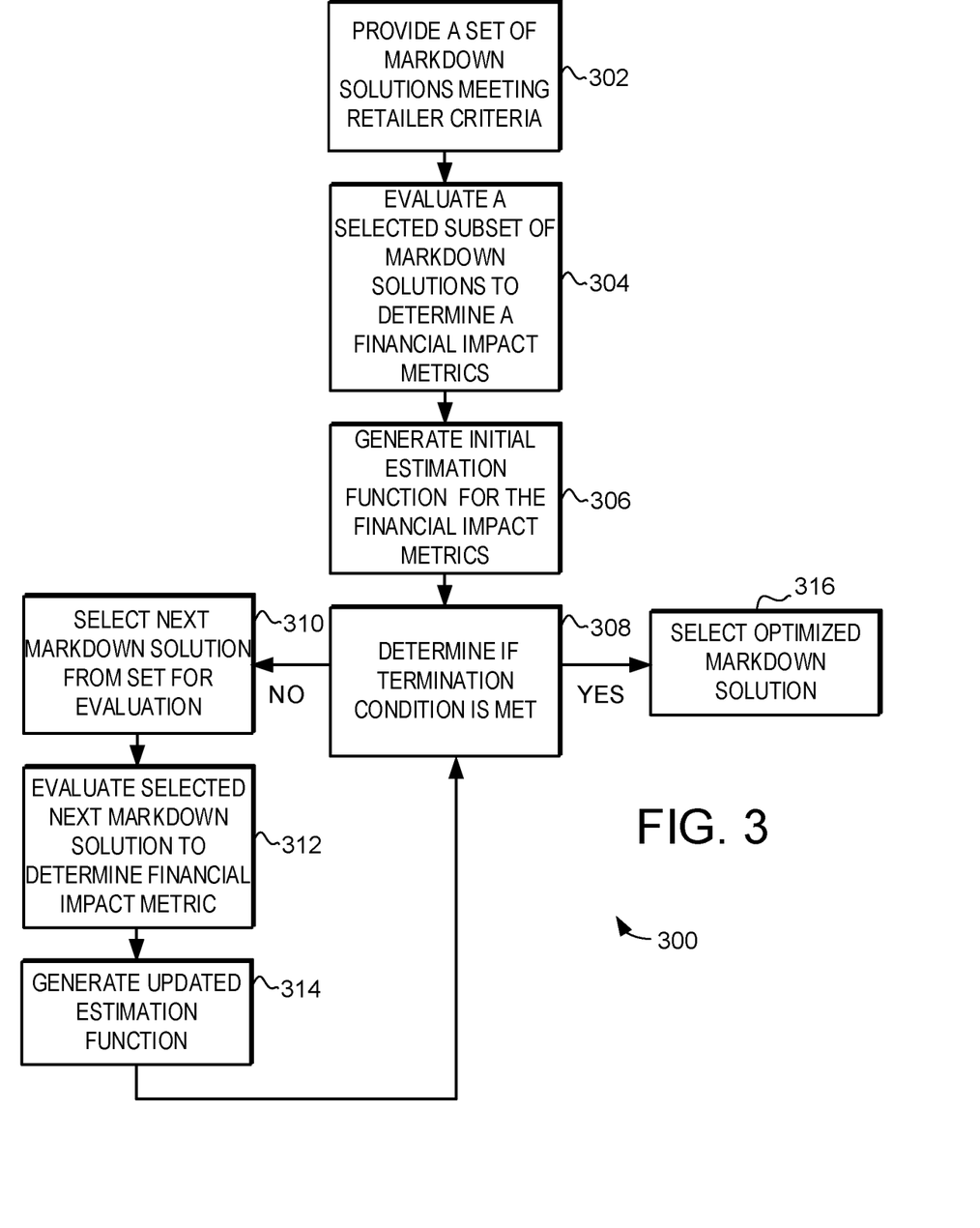
FIG. 3 is a flow diagram of a method 300 in accordance with an exemplary embodiment.

Turning now to FIG. 3, an exemplary markdown optimization method 300 is illustrated. The method 300 is exemplary of the type of methods that can be used to implement markdown optimization in accordance with the embodiments described herein. Again, in general, the markdown optimization method 300 facilitates the evaluating of possible pricing markdown solutions and the selection of an optimized markdown solution with significantly reduced the processing resources. Specifically, the markdown optimization method 300 is implemented evaluate and determine financial impact metrics for a small subset of potential markdown solutions. The method 300 then utilizes Gaussian Process Modeling to generate an estimation function of the financial impact metrics. This estimation function can then be used with a directed search to select new markdown solutions for evaluation, and results of those additional evaluations used to update the estimation function. This process is repeated until an optimized markdown solution is identified.

The markdown optimization method 300 facilitates the identification and selection of an optimized markdown solution using relatively low processing resources. Specifically, the method 300 facilitates the selection of an optimized markdown solution while only requiring an evaluation of a relatively small portion of possible markdown solutions. In some typical embodiments this can provide a 50× or greater reduction in the processing resources required to identify an optimized markdown solution, and thus can provide a large retailer with the ability to perform such an optimization individually for all products needing markdown in each of the stores.

The first step 302 in method 300 is to provide a set of markdown solutions meeting retailer criteria. In general, each markdown solution in the set of markdown solutions defines a series of price reductions for a selected product or group of related products to be implemented over a future defined time period. These markdown solutions are implemented to conform to a set of criteria provided by the retailer or other entity. For example, the markdown solutions can each be designed to conform to criteria on length of the defined markdown time period, the maximum depth of discount percent allowed, the maximum number of separate markdowns allowed during the time period, etc. Again, a simplified example of a set of markdown solution is illustrated in FIG. 2.

Because of the efficiencies provided by the use of Gaussian Process Modeling the set of markdown solutions can include a very large number of markdown solutions and still be effectively optimized. For example, the set of markdown solutions could easily include between 500-25000 markdown solutions and an optimized markdown solution could still be effectively identified and selected using the method 300.

The next step 304 is to evaluate a selected subset of markdown solutions to determine financial impact metrics. In this step an initial subset of markdown solutions is selected to provide good initial range of financial impact metrics. For example, in a typical implementation a set of four or ten initial markdown solutions that span the full set of markdown solutions can be selected for initial evaluation.

With the initial subset of markdown solutions selected, these markdown solutions can be evaluated. In general, each of these initially selected markdown solutions is evaluated using a demand model to forecast the sales that would result from the markdown solution. These forecast sales can then be applied to an objective function to generate a financial impact metric for the each of the selected subset of markdown solutions. Each financial impact metric thus expresses the predicted financial impact that is expected to result from an evaluated markdown solution.

In such embodiments the objective function can be implemented to individually weight the business objectives set by the retailer. Stated another way, the objective function takes the desired business objectives and expresses those business objectives as one overall financial impact metric. Thus, in step 304 the generated demand forecasts can be applied to an objective function to generate a financial impact metrics.

The next step 306 is to generate an initial estimation function for the initial set of financial impact metrics. In this step Gaussian Process Modeling is used to generate this initial estimation function. As described above, Gaussian Process Modeling is a nonparametric learning technique that uses functions to estimate the relationship between data points. Gaussian Process Modeling thus facilitates the extraction of information about the distribution of an estimation function from a relatively small set of determined financial impact metrics.

In this step Gaussian Process Modeling is used to determine this initial estimation function from the determined financial impact metrics for a relatively small subset of initially evaluated markdown solutions. In one embodiment, Gaussian Process Modeling is used to determine the parameters of a selected kernel covariance function. When so determined these parameters of the kernel covariance function provide a fully described estimation function representing the distribution of financial impact metrics. As was described above, any suitable type of kernel covariance function may be used in the Gaussian Process Modeling, including radial basis functions and linear kernel functions.

The next step 308 is to determine if a termination condition is met by one of the evaluated markdown solutions. Again, as one example the termination condition is defined by a "probability of improvement" test. In this embodiment, step 308 is performed by determining if the probability of additional improvement is beyond a threshold amount. If the probability of additional improvement is beyond the threshold amount, the termination condition is considered to be met and the evaluated markdown solution meeting that termination condition is selected.

If the termination condition is not met, the method 300 moves to step 310. In step 310 a next markdown solution from the set of markdown solutions is selected for evaluation. This selected next markdown solution is the next markdown solution that will be evaluated and used to update the estimation function. This selecting step is preferably performed to provide for a directed search for the optimal markdown solution.

In one embodiment, the next markdown solution is selected using an acquisition function. As one specific example of an acquisition function, the next markdown solution can be selected using a maximum expected improvement function. A maximum expected improvement function determines which of the remaining unevaluated markdown solutions is likely to have the greatest expected improvement compared to the previously evaluated markdown solutions and selects that markdown solution for the next evaluation. Other acquisition functions that could be used include maximum probability of improvement functions.

The next step 312 is to evaluate the selected next markdown solution to determine a next financial impact metric. As described above, the selected markdown solution can be evaluated using a demand model to forecast the resulting sales of a particular markdown solution. These forecast sales can then be applied to an objective function to generate a financial impact metric for the selected next markdown solution. This new financial impact metric thus expresses the predicted financial impact that is expected to result from the selected next markdown solution.

This new financial impact metric can then be added to the previously generated set of financial impact metrics. With this updated set of financial impact metrics, the next step 314 is to generate an updated estimation function of the financial impact metrics. In this step Gaussian Process Modeling is again used to generate this updated estimation function. Specifically, Gaussian Process Modeling can be used generate an updated estimation function by again determining the parameters of a selected kernel covariance function with the new financial impact metric included in the set of financial impact metrics. When so determined these parameters of the kernel covariance function provide an updated estimation function representing the distribution of financial impact metrics.

The method 300 then returns to step 308, where the method 300 again determines if a termination condition is met by one of the evaluated markdown solutions. If the termination condition is again not met, the method repeatedly performs steps 310, 312 and 314 and 308, selecting next markdown solutions, evaluating the selected markdown solutions, and generating an updated estimation function until a termination condition is finally met. At that point, the method moves to step 316 where the optimized markdown solution is selected. This selected markdown solution can then be provided to a retailer pricing system or otherwise used to implement the optimized markdown procedure.

Markdown optimization system 100 and method 300 thus both use Gaussian Process Modeling to repeatedly evaluate selected markdown solutions and generate updated estimation functions until an optimized markdown solution is identified. System 100 and method 300 each facilitate the selection of an optimized markdown solution while only performing an evaluation of a relatively small portion of possible markdown solutions. This facilitates the selection of such an optimized markdown solution using relatively low processing resources. In some typical embodiments this can provide a 50× or greater reduction in the processing resources required to identify an optimized markdown solution. This significant improvement in processing requirements facilitates the application of markdown optimization to the inventories of large retailers that can have thousands of products and thousands of stores.

The markdown solution evaluation module 102, the estimation function generation module 104, the termination condition evaluation module 106 and the next markdown solution selection module 108 described above with reference to FIGS. 1 and 2, and the method 300 described above with reference to FIG. 3, can each be can be implemented on a wide variety of platforms.

Figure 4:
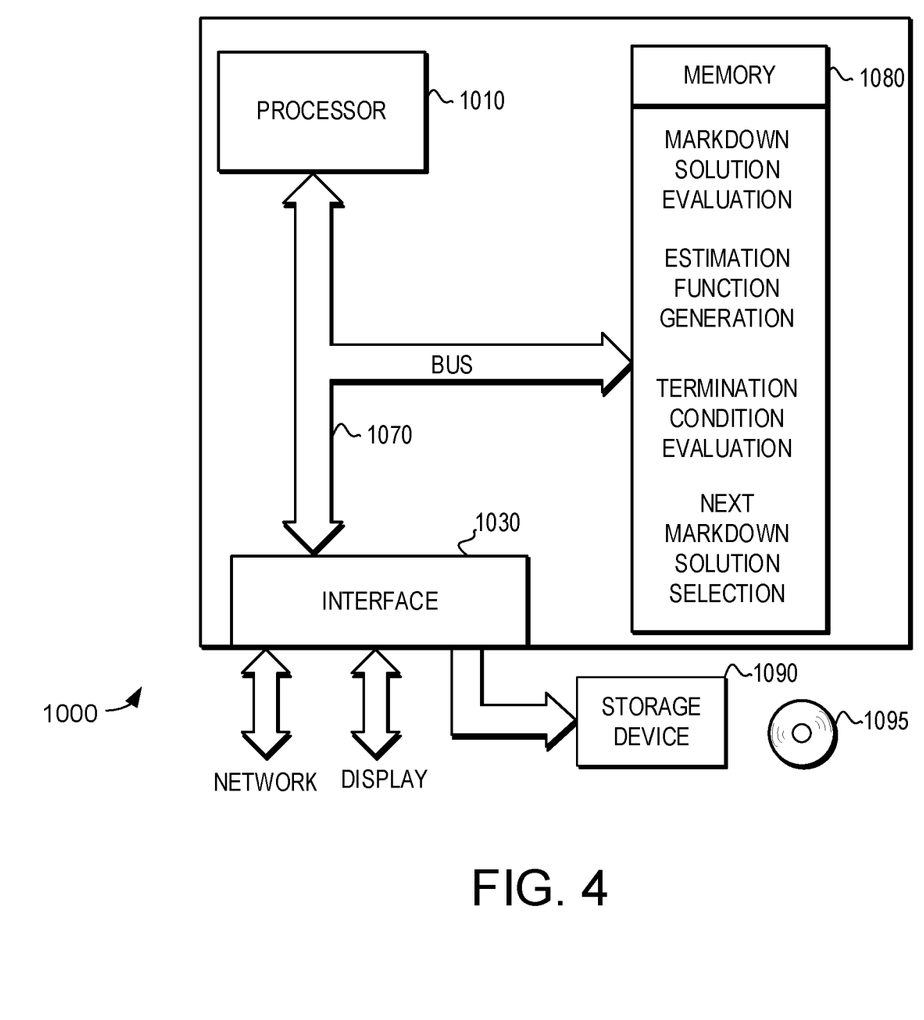
FIG. 4 is a schematic diagram of a computing system in accordance with an exemplary embodiment.

For example, each "module" as defined herein can include a combination of processing hardware and software configured to be executed during markdown optimization. As such, each module will include executable code that is typically part of one or more larger applications that are loaded into memory and executed by one or more processors in a processing system. When so executed, each module will perform its associated actions, such as those described above. Turning now to FIG. 4, an exemplary processing system 1000 is illustrated. Processing system 1000 illustrates the general features of a processing system that can be used to implement the invention. Of course, these features are merely exemplary, and it should be understood that the systems and methods can be implemented using different types of hardware and software and can include more or different features. It should also be noted that the processing system 1000 can be implemented in many different environments, such as part of large networked computer system that spans multiple sites or as discrete individual computer systems. The exemplary processing system 1000 includes a processor 1010, an interface 1030, a storage device 1090, a bus 1070 and a memory 1080. In accordance with the embodiments of the invention, the memory 1080 includes at least a markdown solution evaluation program, estimation function generation program, a termination condition evaluation program, and a next markdown solution selection program.

The processor 1010 performs the computation and control functions of the system 1000. The processor 1010 may comprise any type of processor, include single integrated circuits such as a microprocessor, or may comprise any suitable number of integrated circuit devices and/or circuit boards working in cooperation to accomplish the functions of a processing unit. In addition, processor 1010 may comprise multiple processors implemented on separate systems. In addition, the processor 1010 may be part of an overall larger computer system. During operation, the processor 1010 executes the programs contained within memory 1080 and as such, controls the general operation of the processing system 1000.

Memory 1080 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 1080 may be a single type of memory component, or it may be composed of many different types of memory components. In addition, the memory 1080 and the processor 1010 may be distributed across several different physical devices that collectively processing system 1000. For example, a portion of memory 1080 may reside on one computer system, and another portion may reside on a second computer system.

The bus 1070 serves to transmit programs, data, status and other information or signals between the various components of processing system 1000. The bus 1070 can be any suitable physical or logical means of connecting computer systems and components. This includes, but is not limited to, direct hard-wired connections, fiber optics, infrared and wireless bus technologies. It should also be noted that the processing system 1000 could be implemented as a single system on a chip (SoC). In such a case the bus 1070 can comprise the internal bus of the SoC.

The interface 1030 allows communication to the processing system 1000, and can be implemented using any suitable method and apparatus. It can include a network interfaces to communicate to other systems such as an inventory system (e.g., retailer pricing system 110) and, terminal interfaces to communicate with technicians, and storage interfaces to connect to storage apparatuses such as storage device 1090. Storage device 1090 can be any suitable type of storage apparatus, including direct access storage devices such as hard disk drives, flash systems, floppy disk drives and optical disk drives. As shown in FIG. 4, storage device 1090 can comprise a disc drive device that uses discs 1095 to store data.

In accordance with the embodiments described herein, the processing system 1000 implements a markdown solution evaluation module, an estimation function generation module, a termination condition evaluation module and a next markdown solution selection module. During operation, these modules can be implemented by storing associated programs in the memory 1080 to be executed by processor 1010.

It should be understood that while the present invention is described here in the context of a fully functioning computer system, those skilled in the art will recognize that the mechanisms of the present invention are capable of being distributed as a program product in a variety of forms, and that the embodiments described herein apply equally regardless of the particular type of recordable media used to carry out the distribution. Examples of recordable media include: magnetic disks, flash memory devices, hard drives, memory cards and optical disks (e.g., disc 1095).

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

The forgoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to optimization, and other aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

What is claimed is:

1. A markdown optimization method comprising:
    A) selecting a next markdown solution in a set of markdown solutions for evaluation using an acquisition function to provide a directed search of the set of markdown solutions, where each markdown solution in the set of markdown solutions defines a series of price reductions for a selected product to be implemented over a future defined time period;
    B) generating an updated estimation function for financial impact metrics, the financial impact metrics describing a predicted financial impact expected to result from markdown solutions in the set of markdown solutions, the updated estimation function generated using the selected next markdown solution and Gaussian Process Modeling, where the Gaussian Process Modeling uses a kernel covariance function to describe a statistical distribution of the financial impact metrics over a function space;
    C) determining if a termination condition is met using the updated estimation function; and
    D) responsive to the termination condition not being met, returning to step A); and
    responsive to the termination condition being met, selecting a markdown solution using the updated estimation function.

2. The method of claim 1, wherein the kernel covariance function comprises a radial basis function.

3. The method of claim 1, wherein the step of selecting the next markdown solution using an acquisition function to provide a directed search of the set of markdown solutions comprises using the acquisition function to select the next markdown solution based on maximum expected improvement.

4. The method of claim 1, wherein the step of selecting the next markdown solution using an acquisition function to provide a directed search of the set of markdown solutions comprises using the acquisition function to select the next markdown solution based on maximum probability of improvement.

5. The method of claim 1, wherein the step of determining if a termination condition is met using the updated estimation function comprises determining if a probability of improvement is beyond a threshold.

6. The method of claim 1, further comprising evaluating the selected next markdown solution using an objective function to determine a next financial impact metric for the selected next markdown solution.

7. The method of claim 6, wherein the step of evaluating the selected next markdown solution using an objective function to determine a next financial impact metric for the selected next markdown solution comprises using a demand model with demand coefficients to estimate demand and forecast sales of the selected product over the future defined time period.

8. An apparatus comprising:
a processor;
a memory coupled to the processor; and
a program residing in the memory and being executed by the processor, the program including:
a markdown solution evaluation module, the markdown solution evaluation module configured to evaluate a next markdown solution in a set of markdown solutions using an acquisition function to provide a directed search of the set of markdown solutions, where each markdown solution in the set of markdown solutions defines a series of price reductions for a selected product to be implemented over a future defined time period;
an estimation function generation module, the estimation function generation module configured to generate an updated estimation function for financial impact metrics, the financial impact metrics describing a predicted financial impact expected to result from markdown solutions in the set of markdown solutions using the selected next markdown solution and Gaussian Process Modeling, where the Gaussian Process Modeling uses a kernel covariance function to describe a statistical distribution of the financial impact metrics over a function space;
a termination condition evaluation module, the termination condition evaluation module configured to determine if a termination condition is met using the updated estimation function; and
a next markdown solution selection module, the next markdown solution selection module configured to select a markdown solution using the updated estimation function responsive to the termination condition being met.

9. The apparatus of claim 8, wherein the kernel covariance function comprises a radial basis function.

10. The apparatus of claim 8, wherein the program further includes a next markdown solution selection module, and wherein the next markdown solution selection module is configured to select the next markdown solution in the set of markdown solutions using the acquisition function to provide a directed search of the set of markdown solutions to select the next markdown solution based on maximum expected improvement.

11. The apparatus of claim 8, wherein the program further includes a next markdown solution selection module, and wherein the next markdown solution selection module is configured to select the next markdown solution in the set of markdown solutions using the acquisition function to provide a directed search of the set of markdown solutions to select the next markdown solution based on maximum probability of improvement.

12. The apparatus of claim 8, wherein the termination condition evaluation module is configured to determine if the termination condition is met using the updated estimation function by determining if a probability of improvement is beyond a threshold.

13. The apparatus of claim 8, where the markdown solution evaluation module is configured to configured to evaluate the next markdown solution in the set of markdown solutions using an objective function to determine a next financial impact metric for the next markdown solution.

14. The apparatus of claim 13, where the markdown solution evaluation module is configured to configured to evaluate the next markdown solution in the set of markdown solutions by using a demand model with demand coefficients to estimate demand and forecast sales of the selected product over the future defined time period.

15. A markdown optimization method comprising:
A) providing a set of markdown solutions, where each markdown solution in the set of markdown solutions defines a series of price reductions for a selected product to be implemented over a future defined time period;
B) evaluating each markdown solution in a selected subset of the set of markdown solutions using an objective function to determine a financial impact metric for each markdown solution in the selected subset, the financial impact metrics describing a predicted financial impact expected to result from markdown solutions in the selected subset;
C) generating an initial estimation function for the financial impact metrics for the set of markdown solutions using the financial impact metric for each markdown solution in the selected subset and Gaussian Process Modeling;
D) selecting a next markdown solution from the set of markdown solutions for evaluation using an acquisition function to provide a directed search of the set of markdown solutions;
E) evaluating the selected next markdown solution using the objective function to determine a next financial impact metric for the selected next markdown solution;
F) generating an updated estimation function for the financial impact metrics for the set of markdown solutions using the next financial impact metric and Gaussian Process Modeling, where the Gaussian Process Modeling uses a kernel covariance function to describe a statistical distribution of the financial impact metrics over a function space;
G) determining if a termination condition is met using the updated estimation function;
J) responsive to the termination condition not being met, returning to step D); and
H) responsive to the termination condition being met, selecting a markdown solution using the updated estimation function.

16. The method of claim 15, wherein the step of selecting the next markdown solution comprises using acquisition function to provide a directed search of the set of markdown solutions to select the next markdown solution based on maximum probability of improvement.

17. The method of claim 15, wherein the kernel covariance function comprises a radial basis function.

18. The method of claim 15, wherein the step of determining if a termination condition is met using the updated estimation function comprises determining if a probability of improvement is beyond a threshold value.

19. The method of claim 15, wherein the step of evaluating the selected next markdown solution using the objective function to determine a next financial impact metric for the selected next markdown solution comprises using a demand model with demand coefficients to estimate demand and forecast sales of the selected product over the future defined time period.

\* \* \* \* \*